Nov. 13, 1956 W. F. WOOD 2,770,044
DEVICE AND METHOD FOR MEASURING SURFACE AREAS
Filed March 18, 1953 2 Sheets-Sheet 1

INVENTOR
Walter F. Wood
BY Jowett, Mead, Browne & Schuyler
ATTORNEYS

Nov. 13, 1956  W. F. WOOD  2,770,044
DEVICE AND METHOD FOR MEASURING SURFACE AREAS
Filed March 18, 1953  2 Sheets-Sheet 2

INVENTOR
Walter F. Wood
BY Jewett, Mead, Browne & Schuyler
ATTORNEY

United States Patent Office 2,770,044
Patented Nov. 13, 1956

2,770,044
DEVICE AND METHOD FOR MEASURING SURFACE AREAS

Walter F. Wood, Iowa City, Iowa, assignor to The State of Iowa, for the use and benefit of the State University of Iowa, an educational institution of the State of Iowa, Iowa City, Iowa Application March 18, 1953, Serial No. 343,123

10 Claims. (Cl. 33—121)

This invention relates to a device and method for measuring areas and, more particularly, to a device and method for measuring areas of surfaces such as those on maps, charts, photographs or drawings.

In the analysis of maps, charts, photographs or drawings, it is often necessary to know the area defined by a certain boundary and frequently the boundary is of an irregular nature.

One well-known way of measuring an area on a map defined by an irregular boundary is by means of an instrument known as a planimeter. This is an instrument with which the operator traces the boundary of the area to be measured and thereby actuates an integrating mechanism which registers the total area traced. While areas may be measured with considerable speed and accuracy using a mechanical planimeter this instrument has several disadvantages which it is an object of my invention to overcome.

The operation of the mechanical planimeter requires certain precise adjustments before beginning operation, which are time consuming, and also requires that the operator have a very steady hand since, unless he traces the boundary with extreme care, the area indicated by the planimeter will be in error. Furthermore, use of the mechanical planimeter, which involves the rotation of wheeled members over the surface being measured, requires that the area to be measured be neither too rough nor too smooth. If it is too rough, the wheel which activates the recording mechanism will travel further than it should, thereby introducing an error into the indicated area. If the base material is very smooth, such as that of a glossy photographic print, the wheel may slip and not travel as far as it should, also introducing an error into the indicated area.

Another disadvantage of a mechanical planimeter is that it is difficult or impractical to use in connection with the measurement of an area which is bound into book form, such as a map which is bound into an atlas. Furthermore, the mechanical planimeter is quite expensive and retails at a relatively high price whereas the device of my invention is inexpensive to manufacture.

It is also known to calculate areas of maps and charts mathematically by dividing the area up into segments and then integrating the areas of the segments by the use of mathematical formulae. While this method may be applied with considerable accuracy, it has the disadvantage of being too slow for most purposes.

Accordingly, it is an object of my invention to provide a device for measuring areas of surfaces, such as maps, charts, photographs or drawings, which is simple to operate and inexpensive to manufacture.

It is a further object of my invention to provide a device and method which permits the rapid measurement of areas of maps and other similar articles with a degree of accuracy which is sufficient for most purposes.

It is a further object of my invention to provide a device and method for measuring areas, such as those on maps, which is adaptable to measuring both large areas and small areas, and which is also suitable for measuring the areas of maps or other material bound in book form or otherwise so located as to be difficult to measure by means of mechanical planimeters.

In accordance with these objectives, my invention provides a device and method for measuring areas of surfaces based upon the principle that the number of evenly spaced points falling within a boundary is proportional to the area enclosed by the boundary. In accordance with this principle, I provide an area measuring device which comprises a flat sheet member having a number of evenly spaced points distributed thereon. I refer to these evenly spaced points as being dots, it being understood that this term includes any symbol which can be considered as being a dot in size even though the symbol may not be exactly circular. The flat sheet carrying the uniformly spaced dots and the area which is to be calculated are positioned in superposed relation. Alternate dots are of different shape or color to facilitate counting, and means are provided for dividing the plurality of evenly spaced dots on the sheet into a number of groups and sub-groups to facilitate rapid counting of the dots. The flat sheet member having the plurality of evenly-spaced dots may be either transparent or opaque. I may use in superposed relation to the sheet having the evenly-spaced dots a transparent overlay member on which notations and summations involved in the calculation of area may be made. I also provide in accordance with my invention a method of counting the dots in accordance with which large groups of dots are counted first, with sub-groups and units being counted afterwards.

The features of my invention which I believe to be novel are set forth with particularity in the appended claims. My invention itself, however, both as to its organization and use, together with further objects and advantages thereof, may best be understood by reference to the following description taken in connection with the accompanying drawings in which:

Figure 1:
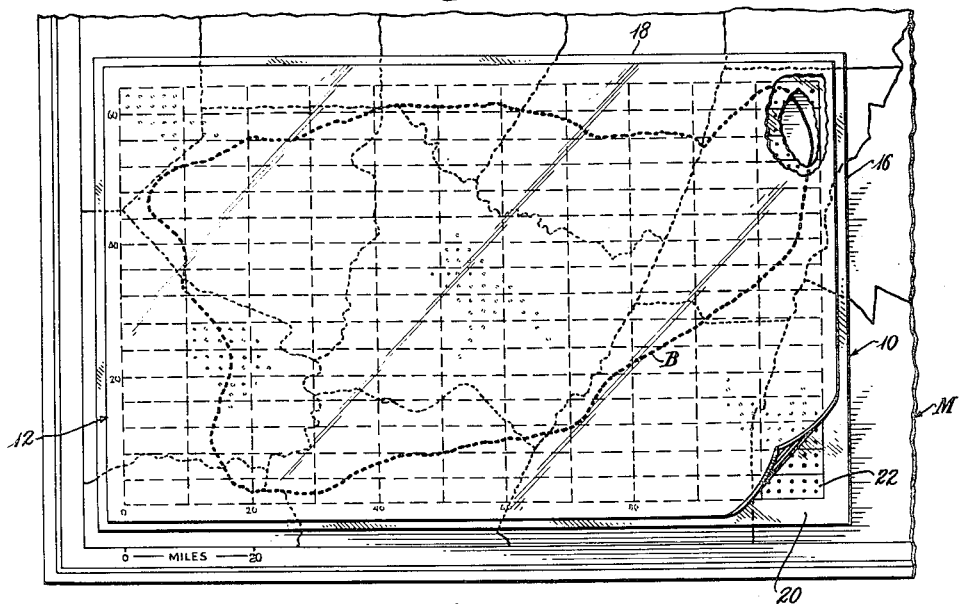
Fig. 1 is a plan view, partially broken away, of an embodiment of my invention utilizing a first transparent sheet having a plurality of dots positioned thereon, and a second transparent sheet in superposed relation to the first sheet for facilitating calculations.

Referring now to the drawings, and more particularly to Figs. 1–4, there is shown an embodiment of my invention in which a first transparent overlay 10 is positioned in superposed relation to a map M and a second transparent overlay 12 is positioned in superposed relation to overlay 10 for use in making calculations of the measured area, as will be hereinafter more fully described. Overlays 10 and 12 and map M are all in the form of flat sheets. The area to be calculated is bounded by the irregular boundary B which may appear directly on the map M or may be traced onto either one or both of the overlays 10 and 12. Due to the fact that the overlays 10 and 12 are transparent, and are positioned in registry with the area to be measured, the area to be measured on map M can be readily viewed, thereby permitting a visual relating of the symbols to the area.

The transparent overlay 12 should preferably have a glazed or glossy surface in order to accept the impressions of a grease pencil or crayon during the process of counting the dots or symbols, and to permit ready removal of the crayon markings by a damp cloth, as will be explained hereinafter.

Figure 3:
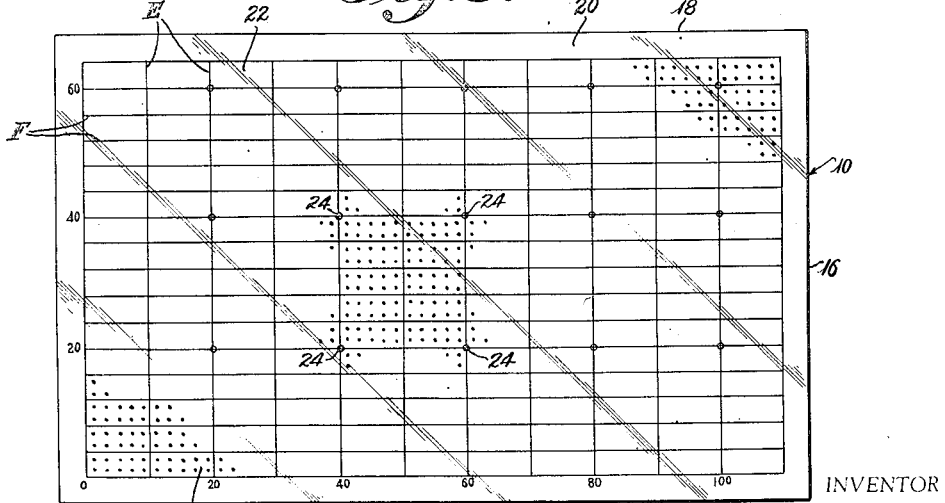
Fig. 3 is a plan view of the dotted sheet of Fig. 1.
Figure 4:
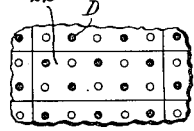
Fig. 4 is an enlarged detail fragmentary view of a portion of Fig. 3.

As can best be seen in Figs. 3 and 4, the transparent overlay 10 is provided with a plurality of evenly spaced dots D which extend in evenly spaced rows and columns. The dots extend in rows parallel to the longitudinal edges 18 of the sheet 10, or parallel to a horizontal axis in the plane of the overlay, and also in columns which are parallel to the transverse edge 16 of sheet 10, or parallel to a vertical axis in the plane of the overlay. The dots cover substantially the entire area of the sheet 10 except for the undotted edge portions 20. Since the dots are evenly spaced in both directions, it can be seen that the entire area covered by the dotted portion of sheet 10 is in effect divided into a number of small segmental areas, with each segmental area being represented by one dot.

To facilitate counting of the dots, I make alternate dots either of different colors, different shadings, or of different shapes. In the embodiment shown in Fig. 4, the dots are shown alternately dark and light. In an alternative arrangement, the dots could be of different shapes or different colors. However, it should be understood that the size of the dots should be kept to a minimum consistent with an ability to count the dots easily.

To further facilitate counting of the dots, vertical and horizontal scales may be provided along the edges of the dotted sheet.

In order to still further facilitate counting of the dots, dots are arranged in sub-groups and groups having any desired number of dots. As shown in Figs. 3 and 4, lines E and F extending parallel to the edges 16 and 18 of sheet 10 divide the dots up into groups of ten. Thus, each group of ten dots is contained in a small box-like sub-group generally indicated as 22. Any desired number of adjacent groups 22 may be joined together into a larger group by placing suitable distinguishing markings or boundary lines around the larger group. For example, in the view shown in Fig. 3, the area defined by each ten groups 22 is bounded by small circles 24 at the outer corners of the area, to define a group of 100 dots.

If the spacing between dots is considered to be one unit in both vertical and horizontal directions in the plane of the paper, then each dot will represent an area one unit square. If the first vertically extending row of dots is positioned ½ unit to the right of the zero point (see Fig. 3) and the first horizontally extending row of dots is positioned ½ unit above the zero point, with all successive rows being displaced 1 unit vertically and horizontally, then, starting from the zero point, each dot will be positioned in the center of its respective unit square. With the dots or symbols positioned at the center of their respective incremental areas, or unit squares, vertical and horizontal scale lines defining a number of units which is an integer or whole number are positioned midway between successive symbols or dots, as may best be seen in the view of Fig. 4.

Figure 5:
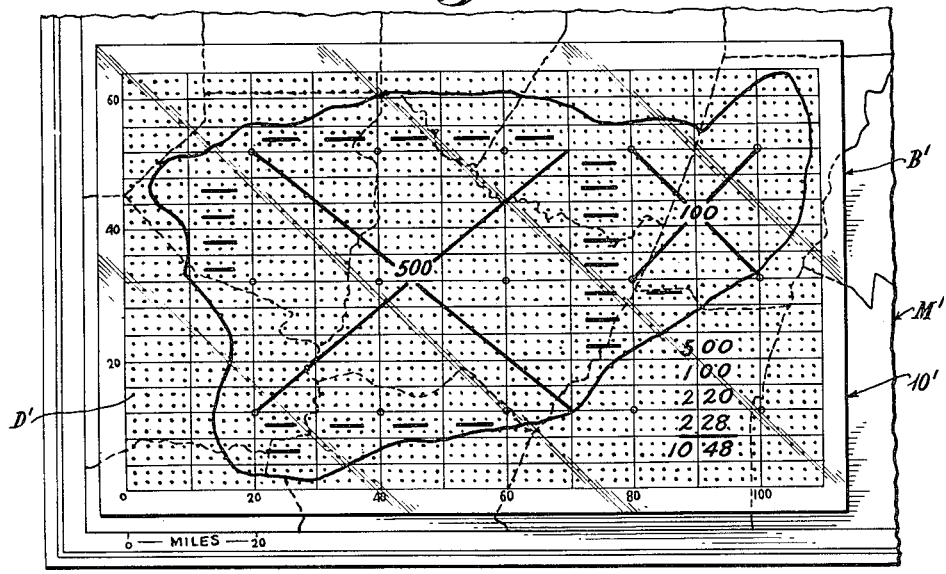
Fig. 5 is a plan view of a modified embodiment of my invention using a single transparent dotted overlay.
Figure 6:
Fig. 6 is a front elevation view of Fig. 5.

The embodiment of my invention shown in Figs. 5 and 6 uses only a single transparent overlay 10' having substantially its entire area covered by uniformly spaced dots or symbols D'. Overlay 10' is positioned in superposed relation to map M' having an area to be calculated bounded by line B'. The boundary line B' may appear on only the map M', only on the transparency 10', or on both the map and the transparency. When only one transparent overlay is used, as in the case of the embodiment of Figs. 5 and 6, the notations and calculations made in connection with the counting of the dots, as will be hereinafter described, are made directly on the face of overlay 10'.

Figure 7:
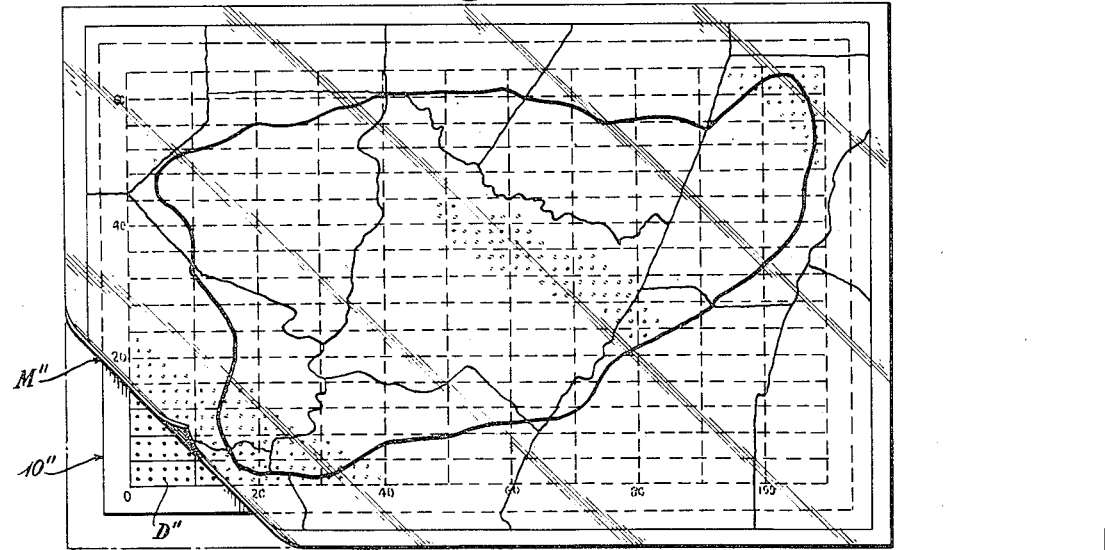
Fig. 7 is a plan view of a still further modified embodiment of my invention in which the area to be calculated is on a transparent member and is in superposed relation to the dotted sheet.
Figure 8:
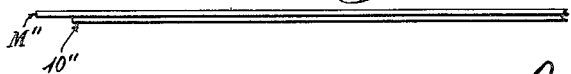
Fig. 8 is a front elevation, partially cut away, of Fig. 7.

The embodiment of my invention shown in Figs. 7 and 8 involves the use of a transparent member M" on which the outline of the area to be calculated is positioned. For example M" could be a transparent chart or map, or may instead be a member on which the outline of the area to be calculated has been traced. The member M" is in superposed relation to a sheet or card 10" carrying uniformly spaced dots D". The dot-carrying member 10" may be opaque. In this embodiment, the notations and calculations involved in the counting of the dots may be made directly on the face of the transparent member M".

Figure 2:
Fig. 2 is a front elevation view of Fig. 1.

In the embodiments of Figs. 5–6 and of Figs. 7–8, the member upon which the notations and summations are to be made during the calculating process (member 10' of Figs. 5–6 and member M" of Figs. 7–8) should preferably have a glazed or glossy surface in order to accept and permit the ready removal of the impressions of a grease pencil or crayon, as previously explained in connection with transparent overlay 12 of the embodiment of Figs. 1–2.

In using the area calculating devices of my invention, it is, of course, very important that the sheet carrying the dots or symbols remain in fixed relation to the map or other article whose area is being computed during the entire calculating process. To aid in this requirement, a map supporting element, which may be made of some relatively stiff material such as hard cardboard may be hingedly or otherwise suitably attached to the dotted sheet to permit interposition of the member whose area is to be calculated between the dotted sheet and the base member. The member whose area is to be calculated may be attached in any suitable means to the base member to insure that no relative movement occurs between the map and the dotted sheet during the computing process.

In describing sheets 10 and 12 of the embodiments of Figs. 1–4, sheet 10' of the embodiment of Figs. 5–6, and sheet M" of the embodiment of Figs. 7–8, I have stated that these members are "transparent." By this I mean that these members transmit sufficient light to permit clear observation of a boundary, or a dotted area positioned underneath and in contacting relation with the transparent member. It is not necessary for my purposes that the degree of transparency be such as to permit observation through the transparent member of articles in spaced relation to that member.

All of the embodiments of my invention shown in Figs. 1–8 involve placing in superposed relation or face-to-face relation a sheet member having uniformly spaced dots and the map or chart, the area of which is to be measured, and then counting the number of dots within the boundary of the area which is to be measured. The principle of counting dots is the same in all of the embodiments of my invention, the principal difference between the various embodiments being in the member on which the notations and calculations in connection with totalizing of the dots is made.

If the area to be measured is small, the dotted sheet is positioned in face-to-face relation to the area to be measured and the number of dots or symbols falling inside the boundary are counted directly as units.

If the area is somewhat larger, as many dots as possible are counted by convenient multiples, using the groups and sub-groups previously mentioned. After this is done, the remaining dots or symbols are counted as individual units and the two sums are added.

If the area is large, the vertical and horizontal scales are employed to make one large grouping of symbols in the form of a large rectangle within the boundary in order to shorten the time required for multiple and unit counting. The remaining symbols are then counted as multiples and units. This method will be illustrated in connection with the embodiment shown in Figs. 5 and 6.

Referring now to Fig. 5 for a more complete description of my method of counting dots by constructing a large rectangle within the area defined by the boundary, the first step is to form as large a rectangle of dots as possible within the boundary B', utilizing groups and sub-groups of dots. In Fig. 5, it will be seen that a rectangle containing 500 dots can be formed within the boundary B'. The vertical and horizontal scales on the edges of the dotted sheet may be used as a guide in determining the number of dots within the rectangle. The number "500" is then entered in the total column and a suitable cross-mark or cancellation is made, preferably by a grease pencil or crayon, over the area of the rectangle. The next step is to count the groups and sub-groups outside of the large rectangle. In the embodiment shown, each group has 100 dots and each sub-group has 10 dots. It is observed that there is one group of 100 dots outside of the large rectangle, and after a suitable entry has been made in the total column, an appropriate cross-mark or cancellation symbol is superimposed over the 100 group. The number of sub-groups of ten dots appearing outside of the large rectangle and outside of the 100 group just counted is then counted. It is determined in the example shown in Fig. 5 that there are 22 sub-groups of ten dots each, for a total of 220 dots. After the total of the dots in the sub-groups has been entered in the total column, appropriate cancellation marks are placed on the sheet 10' above each of the sub-groups to indicate that they have been counted.

The last step in the summation process is to count the individual dots which lie outside of all of the areas already counted. In making such a count, only dots of one of the alternate colors or shapes which lie on the boundary line itself are counted. Each dot lying directly on the boundary line will, on the average, represent only one-half of an incremental area. By counting dots of only one of the alternate colors or shapes lying on the boundary line, the area represented by dots on the boundary is obtained with a sufficiently high degree of accuracy for most purposes since, on the average, dots of one color lying on the boundary will total substantially one-half of all the dots lying on the boundary. A count of the individual dots in the manner just indicated reveals that there are 228 individual dots lying outside of the areas already counted. This figure is entered in the total column and the grand total is calculated to be 1048 dots within the area defined by the boundary B'.

As an alternative to the method just described, the operator may (1) count the number of groups, (2) count sub-groups outside of the groups already counted; and (3) count units outside of the groups and sub-groups already counted. The sum of counts (1), (2) and (3) may be totalized to give the total number of dots within the boundary.

All notations, cancellations and calculations are preferably made by a crayon or grease pencil directly on the glazed surface of either the second transparent overlay 12 of the embodiment of Figs. 1–4, overlay 10' of the embodiment of Figs. 5–6, or member M" of the embodiment of Figs. 7–8. After the area computation has been completed, the grease pencil notations may be conveniently removed by means of a damp cloth, and the device may then be used again.

After the total number of dots has been calculated in any of the manners just described, the next step is to change the result obtained into the type of measure desired. By relating the spacing of the symbols to the number counted and the scale of the map, diagram, or chart, it is possible to obtain the area in terms of any unit such as square miles, square yards, acres, or square kilometers.

In constructing dotted sheets in accordance with my invention, the symbols or dots may be widely spaced if speed is preferred to accuracy. In computing areas using widely spaced symbols, accuracy is obtained by making a plurality of counts, five for example, and obtaining an average total. On the other hand, if the dots are closely spaced sufficient accuracy may be obtained by counting once or twice.

It can be seen from the foregoing that I have provided a device and method for calculating areas of maps, charts, graphs, photographs and other similar objects, which is inexpensive and simple to operate and which may be used with a fairly high degree of accuracy sufficient for most purposes.

Furthermore, the device and method of my invention permit a much more rapid measurement of surface areas than is possible with the use of mechanical planimeters or by mathematical methods of area computation. Thus, it is possible in some instances to complete the measurement of an area using my device and method in less time than is required to set up a mechanical planimeter for operation.

While the device and method of my invention have been described principally in connection with the measurement of flat surface areas, they may also be used for the measurement of the area of certain curved surfaces, such as the area of a cylindrical surface, for example.

While there has been shown and described a particular embodiment of my invention, it will be obvious to those skilled in the art that various changes and modifications can be made therein without departing from the invention and, therefore, it is aimed in the appended claims to cover all such changes and modifications as fall within the spirit and scope of the invention.

I claim:
1. A device for measuring a surface area, said device comprising a first sheet having a surface and a plurality of uniformly spaced apart dots located on said surface, each dot having a minimum size consistent with ability to count the dots easily, the area of said surface throughout which said dots extend being at least coextensive with the area to be measured whereby said first sheet may be placed in registry with the area to be measured and all of the dots located throughout the area to be measured counted, the area of said surface actually covered by said dots being small in relation to the total area of said surface throughout which said dots extend but said dots being visible in relation to the area to be measured, and a second transparent sheet overlying said first sheet.

2. A device according to claim 1 wherein said second transparent sheet has a glossy upper surface to facilitate making calculations thereon without marking the surface of said first sheet and to facilitate easy removal of said calculations.

3. A device for measuring a surface area, said device comprising a first sheet having a surface and a plurality of uniformly spaced apart dots located on said surface, alternate dots presenting a different visual appearance and each dot having a minimum size consistent with ability to count the dots easily, the area of said surface through which said dots extend being at least coextensive with the area to be measured whereby said first sheet may be placed in registry with the area to be measured and all of the dots located throughout the area to be measured counted, the area of said surface actually covered by said dots being small in relation to the area of said surface throughout which said dots extend but said dots being visible in relation to the area to be measured, and a second transparent sheet overlying said first sheet.

4. A device for measuring a surface area, said device comprising a first sheet having an upper surface and a plurality of uniformly spaced apart dots located on said upper surface, said dots being arranged in parallel rows and parallel columns and said dots being of two colors, adjacent dots in each row and in each column being of different colors, the area of said upper surface throughout which said dots extend being at least coextensive with the area to be measured whereby said first sheet may be placed in registry with the area to be measured and all of the dots located throughout the area to be measured counted, the area of said upper surface actually covered by said dots being small in relation to the area of said upper surface throughout which said dots extend but said dots being visible in relation to the area to be measured, and a second transparent sheet overlying said first sheet.

5. A device for measuring a surface area, said device comprising a first sheet having an upper surface and a plurality of uniformly spaced apart dots located on said upper surface, each dot having a minimum size consistent with ability to count the dots easily, said dots being divided into sub-groups, each sub-group containing the same number of dots, and all of the sub-groups being grouped into main groups, each main group containing the same number of sub-groups, the area of said upper surface throughout which said dots extend being at least coextensive with the area to be measured whereby said upper sheet may be placed in registry with the area to be measured and all of the dots located throughout the area to be measured counted, the area of said upper surface actually covered by said dots being small in relation to the area of said upper surface throughout which said dots extend but said dots being visible in relation to the area to be measured, and a second sheet overlying said first sheet.

6. A device for measuring a surface area, said device comprising a first sheet having a plurality of uniformly spaced apart dots located on a surface thereof, said dots being arranged in parallel rows and parallel columns, adjacent dots in each row and in each column being of different colors, all of said dots being divided into sub-groups, each sub-group containing the same number of dots, and all of the sub-groups being grouped into main groups, each main group containing the same number of sub-groups, the area of said surface throughout which said dots extend being at least coextensive with the area to be measured whereby said first sheet may be placed in registry with the area to be measured and all of the dots located throughout the area to be measured counted, the area of said surface actually covered by said dots being small in relation to the area of said surface throughout which said dots extend but said dots being visible in relation to the area to be measured, and a second sheet overlying said first sheet.

7. The method of measuring a surface area defined by a given boundary which comprises the steps of placing a plurality of uniformly spaced apart dots entirely throughout the surface area to be measured up to and including said boundary, keeping the size of said dots to a minimum consistent with ability to count the dots easily, then counting the dots included within said boundary and counting only every other dot touching said boundary, adding said counts and converting the total of said counts into a measure of said area according to the predetermined scale.

8. The method of measuring a surface area defined by a given boundary which comprises the steps of placing a plurality of uniformly spaced apart alternate color dots entirely throughout the surface area to be measured up to and including said boundary, keeping the size of said dots to a minimum consistent with ability to count the dots easily, then counting the dots included within said boundary and counting only the dots of one color touching said boundary, adding said counts and converting the total of said counts into a measure of said area according to a predetermined scale.

9. The method of measuring a surface area defined by a boundary which comprises the steps of placing a plurality of uniformly spaced apart alternate color dots in parallel rows and columns entirely throughout the surface area to be measured up to and including said boundary, adjacent dots in each row and in each column being of different colors, then counting all the dots located within said boundary which do not touch said boundary and counting only the dots of one color which do touch said boundary, adding the numbers obtained by said respective counts, and converting the total into a measure of said area according to a predetermined scale.

10. The method according to claim 9 wherein said dots are divided into a plurality of sub-groups, each sub-group containing the same number of dots, said sub-groups are grouped into main groups, each main group containing the same number of sub-groups, all of the main groups falling within said boundary are counted first, then all of the sub-groups falling outside of the counted main groups but falling within said boundary are counted next, and then the remaining dots are counted individually, all counts are totaled, and then the total of said counts is converted into a measure of said area according to a predetermined scale.

References Cited in the file of this patent

UNITED STATES PATENTS

| | | |
|---|---|---|
| 49,099 | Fox | Aug. 1, 1865 |
| 1,568,183 | Reymond | Jan. 5, 1926 |
| 2,344,823 | Landis et al. | Mar. 21, 1944 |
| 2,407,893 | Meyer | Sept. 17, 1946 |

FOREIGN PATENTS

| | | |
|---|---|---|
| 10,231 | Great Britain | A. D. 1907 |
| 215,914 | Germany | Nov. 1, 1909 |

OTHER REFERENCES

Sang: "Progressive Lessons in Applied Science, Part I—Geometry on Paper," page 67, published by E. and F. N. Spon, London and New York, dated 1875 (QA 529 .S 225).